(12) United States Patent
Jin et al.

(10) Patent No.: US 9,176,622 B1
(45) Date of Patent: Nov. 3, 2015

(54) TOUCH STRUCTURE, TOUCH PANEL AND TOUCH DEVICE (71) Applicants: Shanghai Tianma Micro-Electronics Co., Ltd., Shanghai (CN); Tianma Micro-Electronics Co., Ltd., Shenzhen (CN)

(72) Inventors: Songlin Jin, Shanghai (CN); Feng Lu, Shanghai (CN); Qijun Yao, Shanghai (CN); Dunbo Wang, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/522,538

(22) Filed: Oct. 23, 2014

(30) Foreign Application Priority Data

Jul. 24, 2014 (CN) .......................... 2014 1 0354297

(51) Int. Cl.
| | |
|---|---|
| H01L 21/44 | (2006.01) |
| H01L 21/00 | (2006.01) |
| G06F 3/041 | (2006.01) |
| G06K 11/06 | (2006.01) |
| G08C 21/00 | (2006.01) |
| G06F 21/00 | (2013.01) |
| G06F 3/045 | (2006.01) |
| G06F 3/046 | (2006.01) |
| G06F 3/044 | (2006.01) |

(52) U.S. Cl.
CPC .............. *G06F 3/0416* (2013.01); *G06F 3/044* (2013.01); *G06F 3/046* (2013.01); *G06F 3/0412* (2013.01)

(58) Field of Classification Search
USPC .............. 438/50–53, 584–688; 345/173–184; 178/18.01–20.04; 341/20–35
See application file for complete search history.

(56) References Cited

U.S. PATENT DOCUMENTS

| | | | |
|---|---|---|---|
| 5,506,375 | A | 4/1996 | Kikuchi |
| 2007/0008299 | A1 | 1/2007 | Hristov |
| 2015/0185048 | A1* | 7/2015 | Liu et al. .................... 438/599 |

FOREIGN PATENT DOCUMENTS

JP  5075082  8/2012

* cited by examiner

*Primary Examiner* — Karen Kusumakar
(74) *Attorney, Agent, or Firm* — Alston & Bird LLP (57) ABSTRACT

A touch structure is disclosed. The touch structure includes an active region including a plurality of first conductive patterns, and an inactive region including a wiring. The first conductive patterns at an edge of the active region are electrically connected with each other and are electrically connected with the wiring of the inactive region to form a coil. A touch panel and a touch device including the touch structure are also disclosed.

20 Claims, 12 Drawing Sheets

TOUCH STRUCTURE, TOUCH PANEL AND TOUCH DEVICE

This application claims the benefit of priority to Chinese Patent Application No. 201410354297.1, filed with the Chinese Patent Office on Jul. 24, 2014 and entitled "TOUCH STRUCTURE, TOUCH PANEL AND TOUCH DEVICE", the content of which is incorporated herein by reference in its entirety.

FIELD OF THE INVENTION

The present disclosure relates to the field of touch technologies, in particular to a touch structure, a touch panel, and a touch device.

BACKGROUND OF THE INVENTION

With the development of modern electronic technologies, components are provided in an electronic device to implement some new functions such as an electromagnetic touch sensing function, to provide a user with convenience in use.

A touch structure including a plurality of coils is provided in the electronic device to implement the electromagnetic touch sensing function in the prior art. The electromagnetic touch sensing function is performed in such a way that: when an electromagnetic pen approaches or contacts the electronic device, changes of induced current in the coils generate a corresponding touch signal, and a touch point is determined by means of calculation according to the generated touch signal. However, features such as accuracy of the touch signal at an edge of the touch structure needs to be further improved.

SUMMARY OF THE INVENTION

One inventive aspect is a touch structure. The touch structure includes an active region including a plurality of first conductive patterns, and an inactive region including a wiring. The first conductive patterns at an edge of the active region are electrically connected with each other and are electrically connected with the wiring of the inactive region to form a coil.

Another inventive aspect is a touch panel including a touch structure. The touch structure includes an active region including a plurality of first conductive patterns, and an inactive region including a wiring. The first conductive patterns at an edge of the active region are electrically connected with each other and are electrically connected with the wiring of the inactive region to form a coil.

Another inventive aspect is a touch device including a touch panel. The touch panel includes a touch structure. The touch structure includes an active region including a plurality of first conductive patterns, and an inactive region including a wiring. The first conductive patterns at an edge of the active region are electrically connected with each other and are electrically connected with the wiring of the inactive region to form a coil.

BRIEF DESCRIPTION OF THE DRAWINGS

Features, objects and advantages of the present disclosure will become apparent from the following detailed description of nonrestrictive embodiments made with reference to the accompanying drawings below, in which.

DETAILED DESCRIPTION OF THE EMBODIMENTS

The present disclosure will be further illustrated in detail below in conjunction with the accompanying drawings and embodiments. It may be understood that specific embodiments described herein are merely for explaining the present disclosure rather than limiting the present disclosure. Additionally, it is noted that merely partial contents associated with the present disclosure rather than all contents are illustrated in the accompanying drawings for ease of description.

Figure 1A:
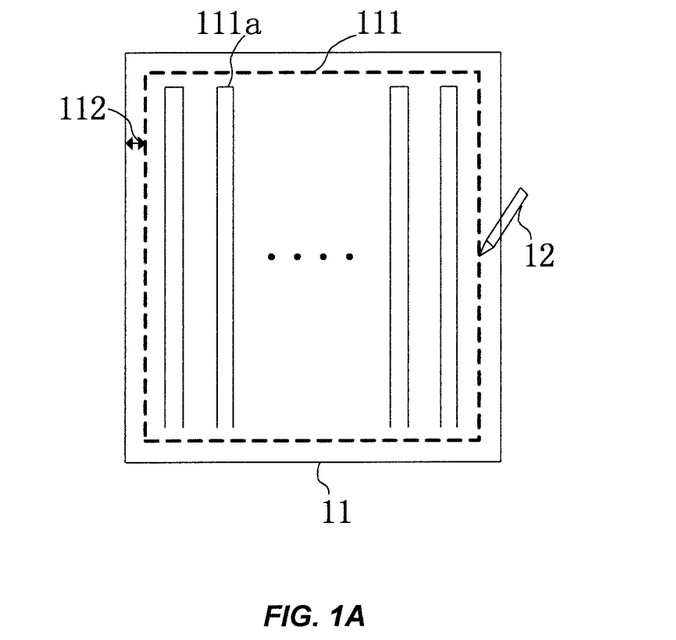
FIG. 1A is a schematic diagram illustrating an electronic device being touched in the prior art.
Figure 1B:
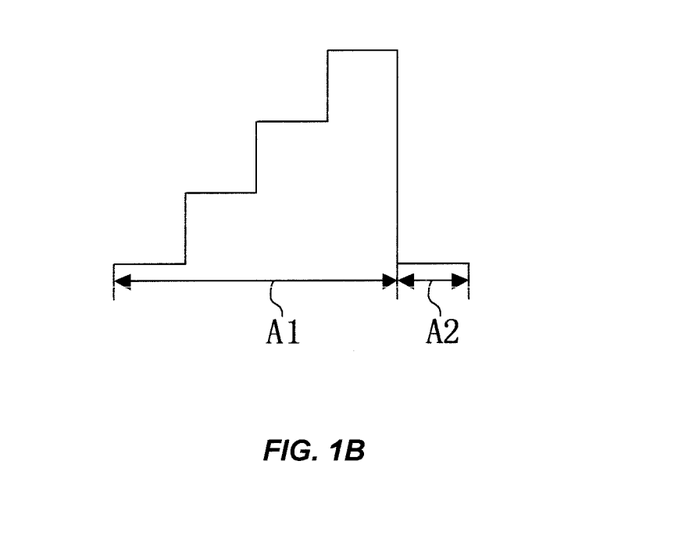
FIG. 1B is a schematic diagram illustrating intensity distribution of a touch signal when a touch position is located at an edge of a touch region of the touch structure in the electronic device in FIG. 1A.

FIG. 1A is a schematic diagram illustrating an electronic device being touched in the prior art, and FIG. 1b is a schematic diagram illustrating intensity distribution of a touch signal when a touch position is located at the periphery of a touch region of the touch structure in the electronic device in FIG. 1A. As shown in FIG. 1A, coils 111a are provided in a touch region 111 of the electronic device 11, and when an electromagnetic pen touches a position around the border between the touch region 111 and a peripheral region 112 or touches the peripheral region 112, the intensity distribution of a touch signal generated in the coils 111a is shown in FIG. 1b. In FIG. 1b, a portion A1 of the intensity distribution of the touch signal has a stepped shape and is generated by coils 111a close to the right edge of the touch region 111, and a portion A2 of the intensity distribution of the touch signal is degraded to the lowest level because there are no coils within the peripheral region 112, therefore, the intensity distribution of the touch signal is significantly uneven when the touch position is located at the edge of the touch region 111 and the touch signal is incomplete, so that the touch signal is susceptible to noise, thereby decreasing corresponding features of the touch signal such as linearity, accuracy and sensitivity.

An Embodiment

Several concepts are introduced first for sake of clear description of technical solutions. An active region refers to an area corresponding to the touch region and configured for enabling a touch structure to implement a touch sensing function, that is, coils for implementing the touch sensing function are mainly arranged in the active region, and the active region excludes other auxiliary lines or control lines for touch sensing provided within the peripheral region in a particular case; and an inactive region corresponds to the peripheral region and surrounds the active region, and may be configured to accommodate elements such as wirings and drive circuits, to enable elements in the active region to work properly.

As shown in the FIGS. 1a and 1b, and as can be seen from the prior art, when the electromagnetic pen 112 touches an edge of the touch region 111, the generated touch signal is incomplete and is susceptible to noise, thereby decreasing features such as linearity, accuracy and sensitivity of the touch signal at the corresponding touch position. In view of the above, the present embodiment of the present invention provides technical solutions below.

The present embodiment of the present invention provides a touch structure including an active region and an inactive region, where, the active region includes a plurality of first conductive patterns, the inactive region includes wirings, the first conductive patterns at the edge of the active region are electrically connected with each other, and electrically connected with the wirings in the inactive region to form the coils.

It is noted that a portion of the coils is formed by electrically connecting the first conductive patterns at the edge of the active region. It is noted that the first conductive patterns are not limited to the edge of the active region. The other portion of the coils is formed by the wirings within the inactive region. Thus, the formed coils are located at the edge of the active region and within the inactive region. Since a large area can be surrounded by the wiring within the inactive region, an area surrounded by the coil can be mainly located in the inactive region.

Figure 2A:
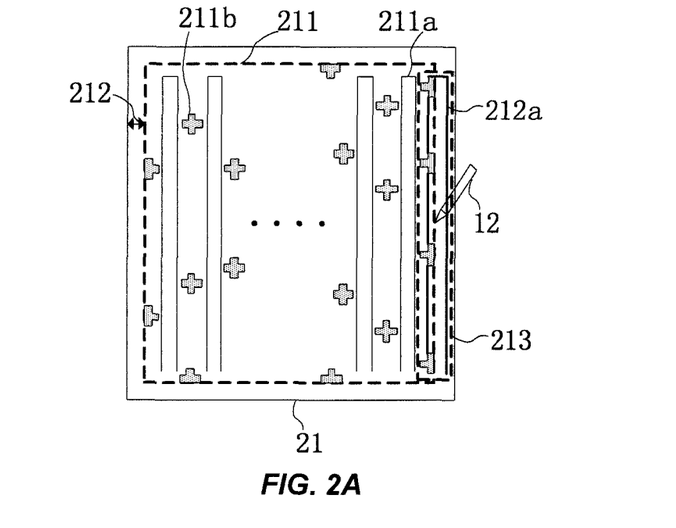
FIG. 2A is a schematic diagram illustrating an electronic device employing the touch structure according to an embodiment of the present invention when the electronic device is being touched.
Figure 2B:
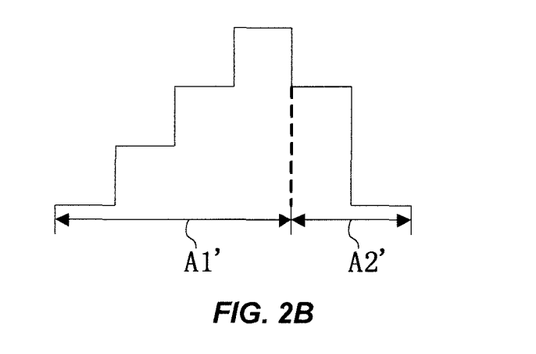
FIG. 2B is a schematic diagram illustrating intensity distribution of a touch signal when a touch position is located at an edge of an active region of the touch structure in the electronic device in FIG. 2A.

FIG. 2A is a schematic diagram illustrating an electronic device employing the touch structure according to the present embodiment of the present invention when the electronic device is being touched, and FIG. 2B is a schematic diagram illustrating intensity distribution of a touch signal when a touch position is located at an edge of a touch region of the touch structure in the electronic device in FIG. 2A. In the present embodiment, as shown in FIG. 2A, an active region 211 of the touch structure in the electronic device 21 includes coils 211a and the first conductive patterns 211b, the inactive region 212 includes a wiring 212a, and the first conductive patterns 211b at the right edge of the active region 211 are electrically connected with each other and electrically connected with the wiring 212a to form a coil 213. When an electromagnetic pen 12 touches the edge of the active region 211, the intensity distribution of a touch signal generated in each coil is shown in FIG. 2B. In FIG. 2B, a portion A1' of the intensity distribution of the touch signal has a stepped shape and is generated by the coils 211a which are close to the right edge of the active region 211 and within the active region 211, and a portion A2' of the intensity distribution of the touch signal is formed by the coil 213 which is at the edge of the active region 211 and overlap with the inactive region 212. In comparison with the portion A2 of the intensity distribution of the touch signal in the prior art shown in FIG. 1b, the portion A2' shown in FIG. 2B includes a step and then is degraded to the lowest level, which means that the generated touch signal is improved significantly when the touch position is located at the edge of the active region 211 in the present embodiment, and the touch signal is not susceptible to noise in comparison with a touch signal in the prior art, thereby improving the corresponding features such as linearity, accuracy and sensitivity of the touch signal.

With the touch structure according to the present embodiment of the present invention, the active region of the touch structure includes a plurality of first conductive patterns, the inactive region includes wirings, and the first conductive patterns at the edge of the active region are electrically connected with each other and electrically connected with the wirings in the inactive region to form the coils, which can improve the features such as linearity, accuracy and sensitivity of the touch signal generated at the edge of the active region of the touch structure.

In the present embodiment, the first conductive pattern may have a cross shape, a diamond shape, or a square shape, or other shapes, which are not limited. In the subsequent embodiments of the present invention, the first conductive patterns are described for instance to have the cross shape.

Figure 3A:
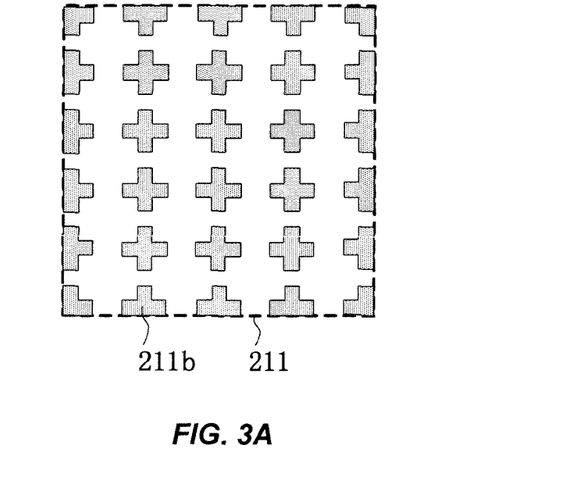
FIG. 3A is a schematic diagram illustrating first conductive patterns arranged in an array according to the above mentioned embodiment of the present invention.
Figure 3B:
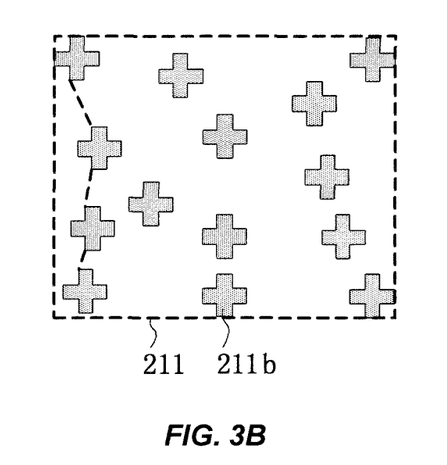
FIG. 3B is a schematic diagram illustrating first conductive patterns arranged irregularly according to the above mentioned embodiment of the present invention.

In the present embodiment, preferably, the plurality of first conductive patterns are arranged in an array. FIG. 3a is a schematic diagram illustrating first conductive patterns arranged in an array according to the present embodiment of the present invention. As shown in FIG. 3a, the first conductive patterns 211b are arrange in an array in the active region 211. Therefore, on one hand, it is easy to arrange the desired first conductive patterns 211b at the edge of the active region 211, on the other hand, it is also easy that the first conductive patterns 211b at the edge of the active region 211 are electrically connected with each other and then electrically connected with the wiring in the inactive region to form a coil, which surrounds a small area in the active region 211 without affecting coils provided normally in the active region 211. FIG. 3B is a schematic diagram illustrating first conductive patterns arranged irregularly according to the present embodiment of the present invention. As shown in FIG. 3B, the first conductive patterns 211b are arrange irregularly in the active region 211. Due to such irregular arrangement, on one hand, it is not easy to determine which first conductive patterns 211b are close to the edge of the active region 211, and on the other hand, after the first conductive patterns 211b determined to be close to the edge of the active region 211 are electrically connected with each other, for example, some first conductive patterns $211^b$ at the left edge of the active region 211 in FIG. 3B are electrically connected with each other (as indicated by dashed lines between the first conductive patterns $211^b$), and then electrically connected with a wiring in the inactive region to form a coil, the formed coil surrounds a larger area in the active region 211, and the wirings for electrically connecting the first conductive patterns $211^b$ may be longer or much longer, affecting the coils arranged normally in the active region 211.

In the present embodiment, preferably, the first conductive patterns are dummy electrodes. The dummy electrodes can be arranged in the active region of the touch structure, and can be generally electrically connected with ground, to provide an electrostatic protection effect on coils or other electric components arranged in the active region. The dummy electrodes provided in the active region can be used as the first conductive patterns according to the present disclosure, where the dummy electrodes away from the edge of the active region may be electrically connected with ground to obtain an electrostatic protection effect, and the dummy electrodes close to the edge of the active region are electrically connected with each other and electrically connected with wirings in the inactive region to form coils located at both the edge of the active region and the inactive region, thereby improving the features such as linearity, accuracy and sensitivity of the generated touch signal when the touch location is located at the edge of the touch region.

Figure 4A:
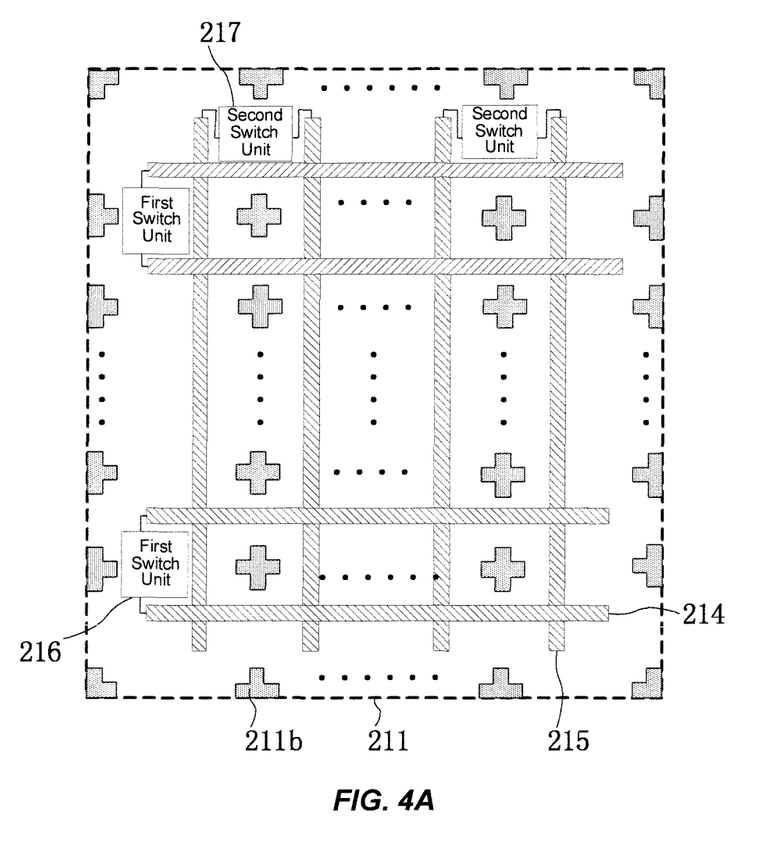
FIG. 4A is a schematic diagram illustrating the structure of an electromagnetism and capacitance integrated touch structure according to the above mentioned embodiment of the present invention.
Figure 4B:
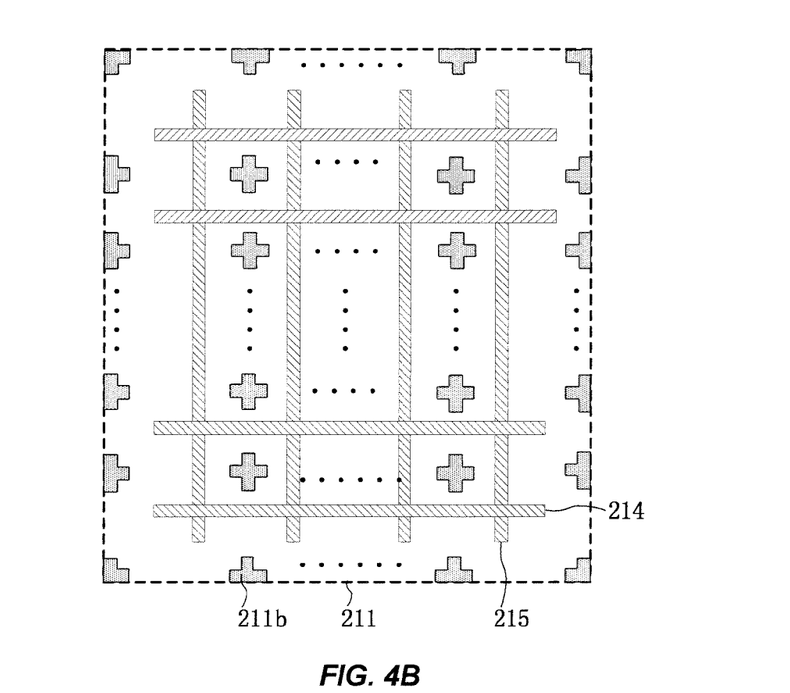
FIG. 4B is a schematic diagram illustrating the equivalent structure of the electromagnetism and capacitance integrated touch structure in FIG. 4A being subjected to an electromagnetic touch.
Figure 4C:
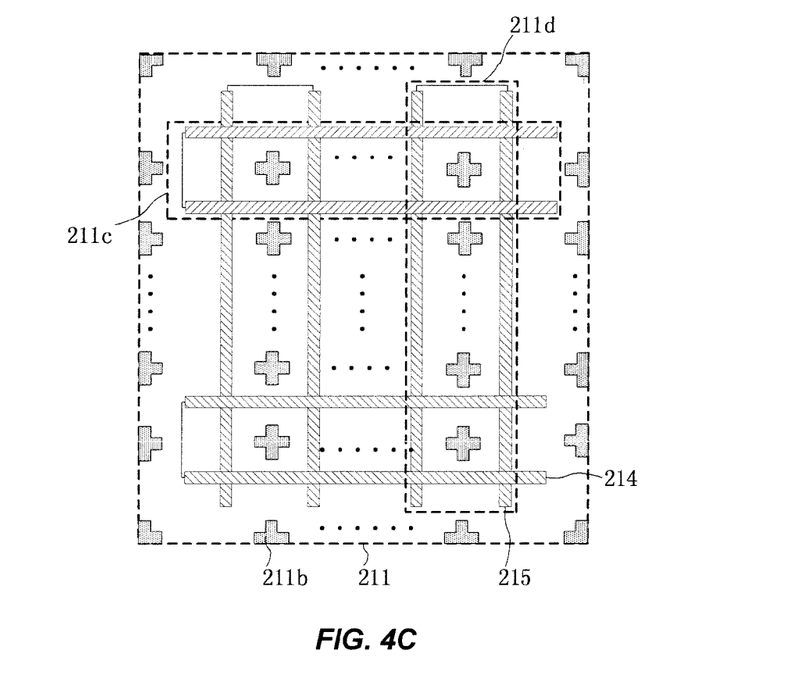
FIG. 4C is a schematic diagram illustrating the equivalent structure of the electromagnetism and capacitance integrated touch structure in FIG. 4A being subjected to an electromagnetic touch.

In the present embodiment, as shown in FIG. 2A, the touch structure is preferably an electromagnetic touch structure, or an electromagnetism and capacitance integrated touch structure. FIG. 4A is a schematic diagram illustrating the structure of an electromagnetism and capacitance integrated touch structure according to the present embodiment of the present invention. As shown in FIG. 4A, the electromagnetism and capacitance integrated touch structure is designed in such a way that: the active region 211 includes the first conductive patterns 211b, and driving electrodes 214 and sensing electrodes 215 (or sensing electrodes 214 and driving electrodes 215) for implementing capacitive touch sensing, where, every two adjacent driving electrodes 214 are electrically connected via a first switch unit 216, and every two adjacent sensing electrodes 215 are electrically connected via a second switch unit 217, which are not limited thereto, for example, when the first two adjacent driving electrodes 214 are electrically connected via a first switch unit 216, then the subsequently every two adjacent driving electrodes 214 are electrically connected via a first switch unit 216 by skipping at least one of the driving electrodes 214, and when the first two adjacent sensing electrodes 215 are electrically connected via a second switch unit 217, then the subsequently every two adjacent sensing electrodes 215 are electrically connected via a second switch unit 217 by skipping at least one of the sensing electrodes 215. When the electromagnetism and capacitance integrated touch structure performs the capacitive touch sensing, the first switch units 216 and the second switch units 217 are opened, thus all the driving electrodes 214 are independent of each other and all the sensing electrodes 215 are independent of each other, and an equivalent diagram of the touch structure of FIG. 4A is shown in FIG. 4b. When the electromagnetism and capacitance integrated touch structure performs the electromagnetic touch sensing, the first switch units 216 and the second switch units 217 are closed, and an equivalent diagram of the touch structure of FIG. 4A is shown in FIG. 4C, so that the every two adjacent driving electrodes 214 are electrically connected to form a horizontal coil 211c, the every two adjacent sensing electrodes 215 are electrically connected to form a vertical coil 211d, and such horizontal coils and vertical coils can be used for performing the electromagnetic touch sensing function. It is noted that the above electromagnetism and capacitance integrated touch structure is such that both the capacitance touch sensing function and the electromagnetic touch sensing function are achieved by the driving electrodes 214 and the sensing electrodes 215. However, the coils for performing the electromagnetic touch sensing function and the driving electrodes and the sensing electrodes for performing the capacitance touch sensing function are arranged independently, and then integrated together to form the electromagnetism and capacitance integrated touch structure, under such circumstance, when the capacitance touch sensing function is performed, the driving electrodes and the sensing electrodes are in an active state, and the coils are in an inactive state; when electromagnetic touch sensing function is performed, the coils are in an active state, and the driving electrodes and the sensing electrodes are in an inactive state.

Based on the above principle, there are various specific implementations of forming a coil by using the first conductive patterns at the edge of the active region and the wiring within the inactive region in the touch structure. For example, the first conductive patterns for forming the coil may be located at one or more edges of the active region, and the location relationships between the first conductive patterns and the coils provided with the active region may be varied, as long as the coils formed by the first conductive patterns at the edge of active region and the wirings within the inactive region can improve the features of the touch signal generated at the edge of the active region. Preferable embodiments are illustrated in detail below.

An Embodiment

Figure 5A:
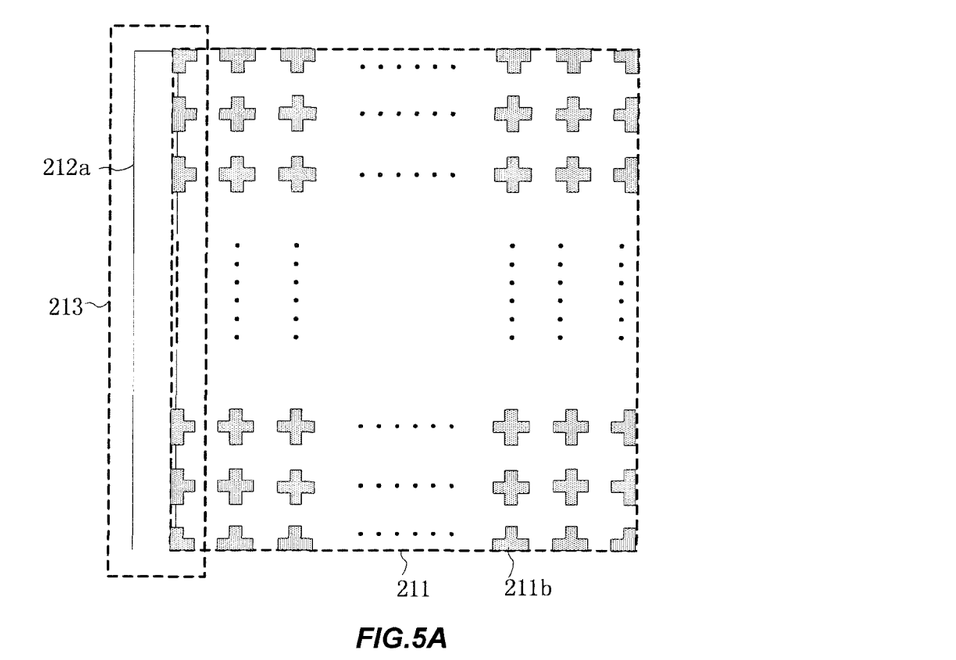
FIG. 5A is a schematic diagram illustrating the structure of a touch structure according to another embodiment of the present invention.

FIG. 5A is a schematic diagram illustrating the structure of a touch structure according to the present embodiment of the present invention. As shown in FIG. 5A, on the basis of the touch structure of the above mentioned embodiment, the touch structure of the present embodiment is such that: the first conductive patterns 211$^b$ at the same edge (such as an edge at the left side as shown in FIG. 5A) of the active region 211 are electrically connected with each other, and electrically connected with the wiring 212a in the inactive region at the same side (such as the left side as shown in FIG. 5A) to form a coil 213.

Figure 5B:
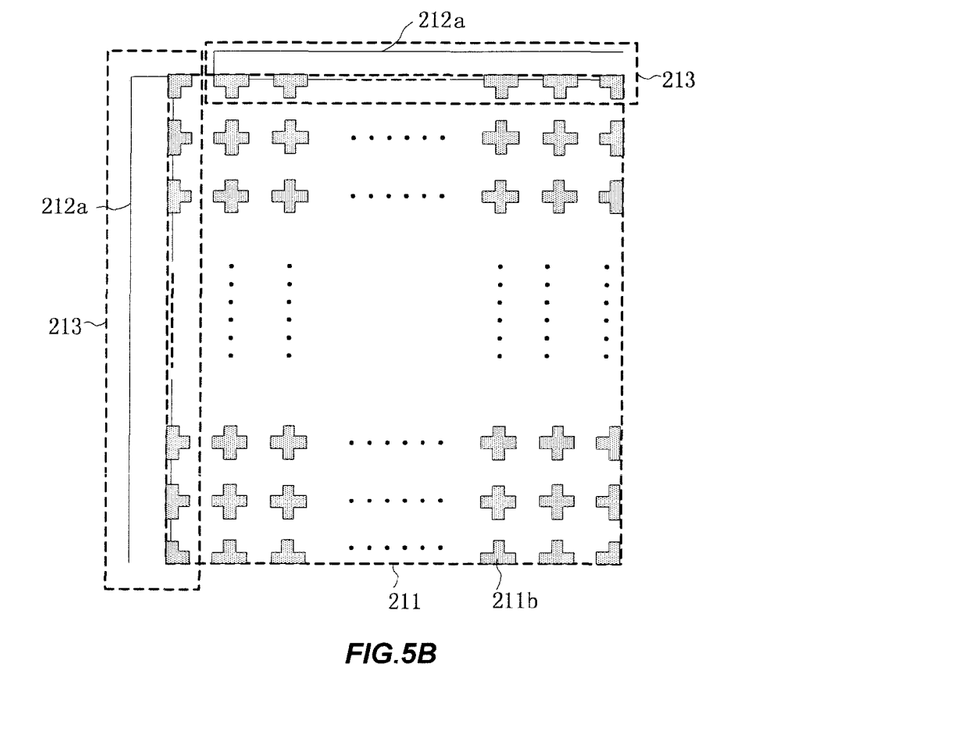
FIG. 5B is a schematic diagram illustrating the structure of another touch structure according to the above mentioned embodiment of the present invention.
Figure 5C:
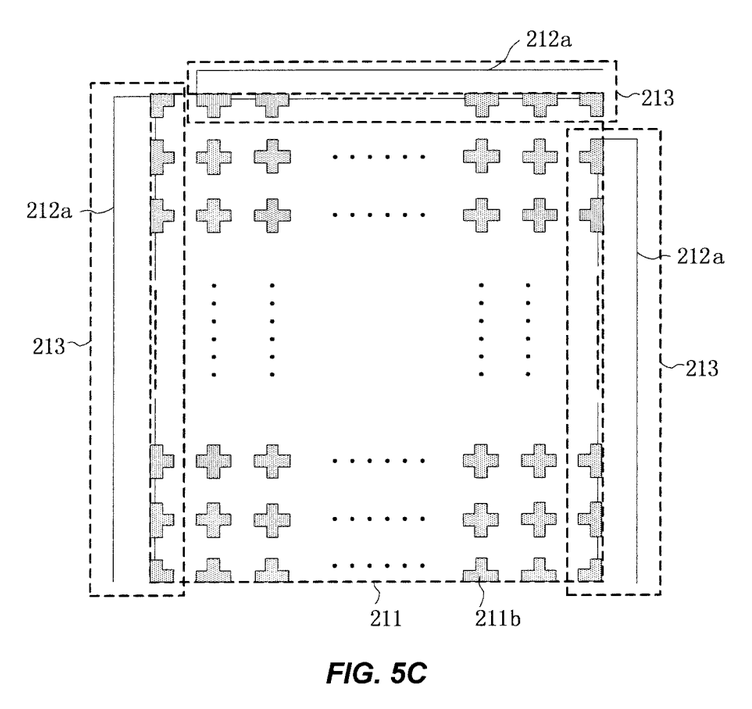
FIG. 5C is a schematic diagram illustrating the structure of yet another touch structure according to the above mentioned embodiment of the present invention.

It is noted that FIG. 5A merely illustrates a specific example of the present embodiment, and in some other specific examples, the first conductive patterns at any other edge of the active region may be electrically connected with each other. In addition to the above case, the first conductive patterns at an edge of the active region on each of two or more sides are electrically connected with each other and then electrically connected with the wiring at the same side to form the coil. For example, as shown in FIG. 5B, on the basis of the example in FIG. 5A, the first conductive patterns 211b at the upper edge of the active region 211 are electrically connected with each other, and electrically connected with the wiring 212a in the inactive region at the upper side to form a coil 213 at the upper side of the active region 211, so that the coils 213 are formed respectively at the left and upper edges of the active region 211 and overlap with the inactive regions at the respective sides. Or, the coils 213 may be formed respectively at the left and right edges of the active region 211 and overlap with the inactive regions at the respective sides (not shown). As shown in FIG. 5C, on the basis of the example in FIG. 5B, the first conductive patterns 211b at the right edge of the active region 211 are electrically connected with each other, and electrically connected with the wiring 212a in the inactive region at the right side to form a coil 213 that is at the right edge of the active region 211 and overlaps with the inactive region at the right side, so that the coils 213 are formed respectively at the left, upper and right edges of the active region 211 and overlap with the inactive regions at the respective sides.

In the present embodiment, each of the formed coils 213 is merely located at one side of the active region 211, and the formed coil 213 can improve the features of a touch signal at the side, and it can be easily determined which edge of the active region 211 is touched.

An Embodiment

Figure 6A:
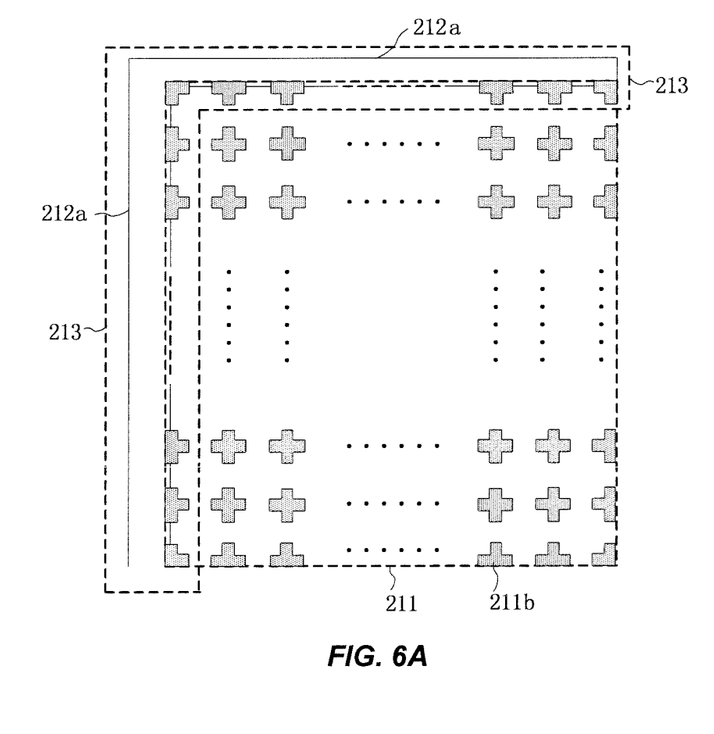
FIG. 6A is a schematic diagram illustrating the structure of a touch structure according to another embodiment of the present invention.

FIG. 6A is a schematic diagram illustrating the structure of a touch structure according to the present embodiment of the present invention. As shown in FIG. 6A, on the basis of the touch structure of the above mentioned embodiment, the touch structure of the present embodiment is such that: the first conductive patterns 211$^b$ at edges on two adjacent sides (such as left and upper sides as shown in FIG. 6A) of the active region 211 are electrically connected with each other, and electrically connected with the wirings 212a within the inactive region at the respective sides (such as the left and upper sides as shown in FIG. 6A) to form coils 213.

Figure 6B:
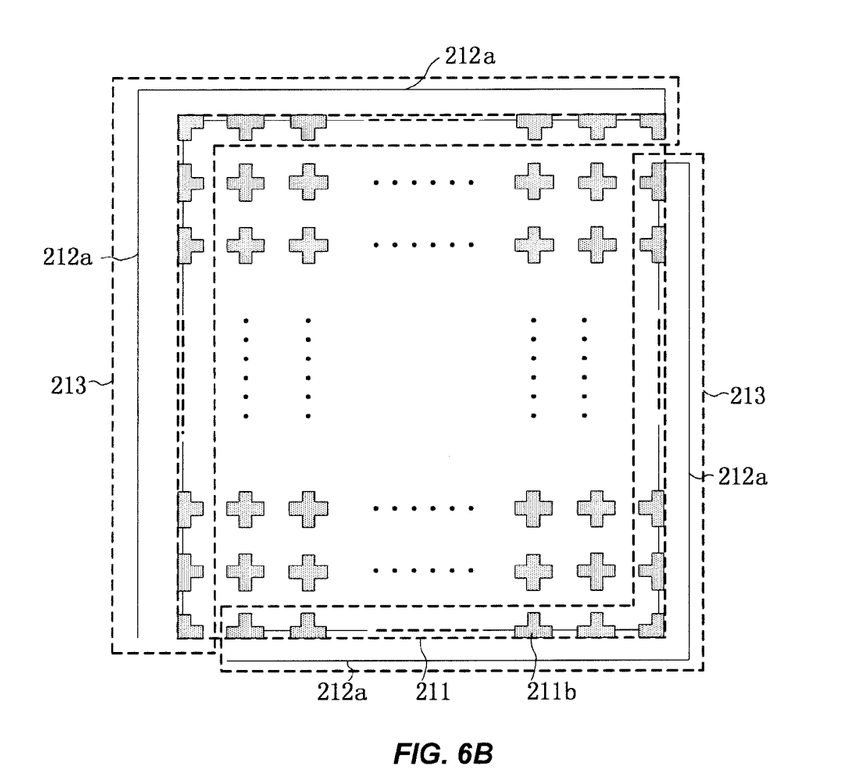
FIG. 6B is a schematic diagram illustrating the structure of another touch structure according to the above mentioned embodiment of the present invention.

It is noted that FIG. 6A merely illustrates a specific example of the present embodiment, and in other specific examples, the first conductive patterns at edges on any other two adjacent sides of the active region may be electrically connected with each other. Additionally, not only the first conductive patterns at a group of any two adjacent sides are electrically connected with each other, also the first conductive patterns at the remaining another group of two adjacent sides may be electrically connected with each other and electrically connected with the wirings 212a at the respective sides to form the respective coils 213. For example, as shown in FIG. 6B, on the basis of the example in FIG. 6A, the first conductive patterns 211b at the right and lower edges of the active region 211 are electrically connected with each other, and electrically connected with the wirings 212a within the inactive region at the respective sides to form coils 213 which are at the right and lower edges of the active region 211 and overlap with the inactive region at the respective sides.

Figure 6C:
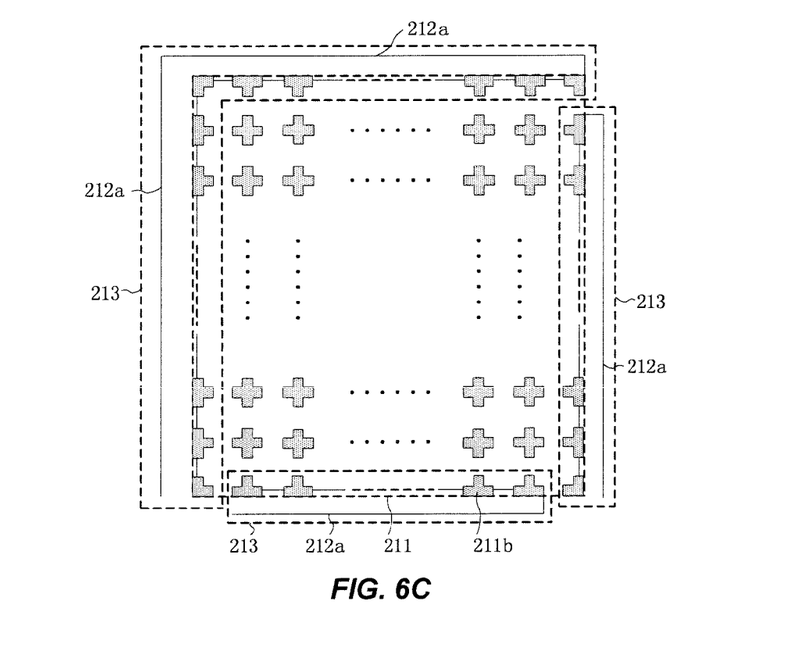
FIG. 6C is a schematic diagram illustrating the structure of yet another touch structure according to the above embodiment of the present invention.

It is further noted that on the basis of electrically connecting the first conductive patterns 211$^b$ at a group of any two adjacent sides of the active region, the first conductive patterns 211$^b$ at each same side of the remaining two sides may be electrically connected with each other and electrically connected with the wiring 212a at the same side to form a coil 213. For example, as shown in FIG. 6C, on the basis of the example in FIG. 6A, the first conductive patterns 211b at the right edge of the active region 211 are electrically connected with each other, and electrically connected with the wiring 212a within the inactive region at the right side to form a coil 213 that is at the right edge of the active region 211 and overlaps with the inactive region at respective side; and the first conductive patterns 211$^b$ at the lower edge of the active region 211 are electrically connected with each other, and electrically connected with the wiring 212a within the inactive region at the lower side to form a coil 213 that is at the lower edge of the active region 211 and overlaps with the inactive region at respective side.

An Embodiment

Figure 7A:
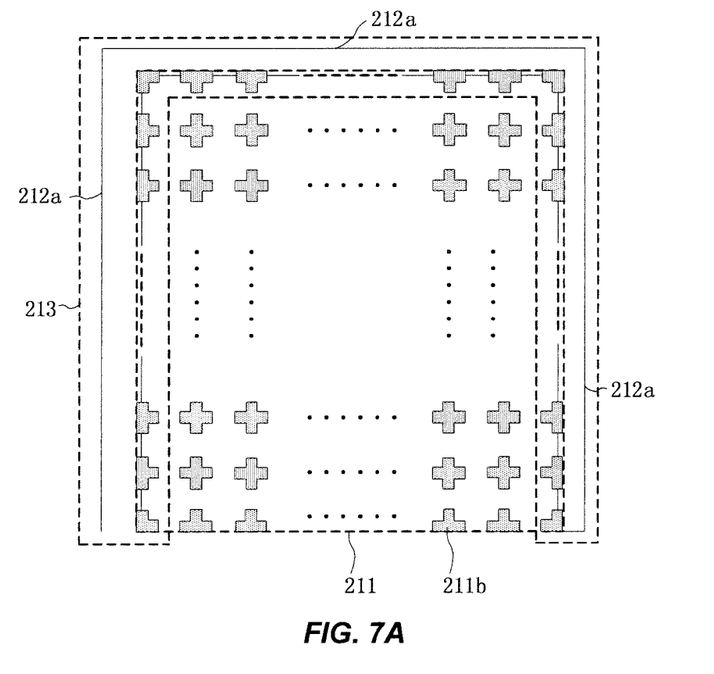
FIG. 7A is a schematic diagram illustrating the structure of a touch structure according to another embodiment of the present invention.

FIG. 7A is a schematic diagram illustrating the structure of a touch structure according to a present embodiment of the present invention. As shown in FIG. 7A, on the basis of the touch structure of the above mentioned embodiment, the touch structure of the present embodiment is such that: the first conductive patterns 211$^b$ at edges on three sides (such as left, upper and right sides in FIG. 7A) of the active region 211 are electrically connected with each other, and electrically connected with the wirings 212a within the inactive region at the respective sides (such as left, upper and right sides in FIG. 7A) to form the coils 213.

Figure 7B:
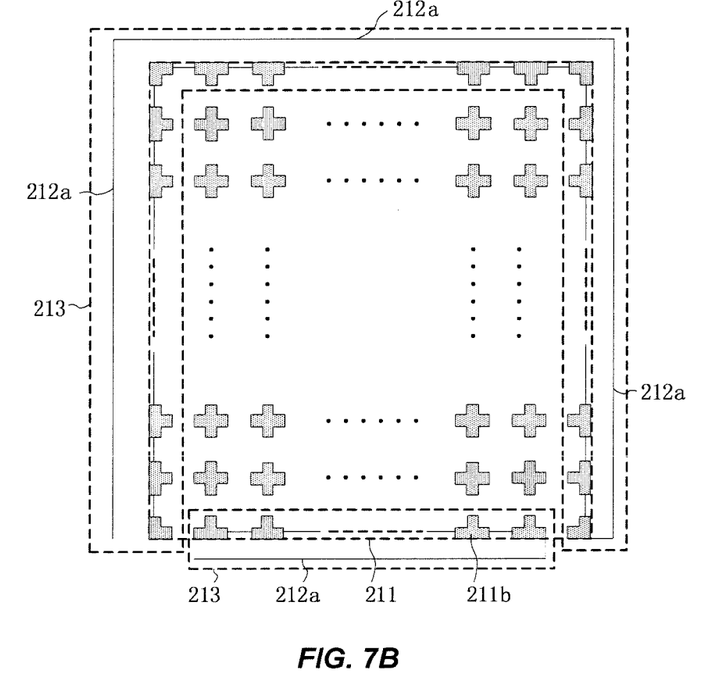
FIG. 7B is a schematic diagram illustrating the structure of another touch structure according to the above mentioned embodiment of the present invention.

It is noted that FIG. 7A merely illustrates a specific example of the present embodiment, and in other specific examples, the first conductive patterns at any other three sides of the active region may be electrically connected with each other. Additionally, in addition to electrically connecting the first conductive patterns at any three sides of the active region, the first conductive patterns at the remaining side of the active region may be electrically connected with each other, and electrically connected with the wiring within the inactive region at the remaining side to form a coil 213 that is at the remaining edge and overlaps with the inactive region at the remaining side. For example, as shown in FIG. 7B, on the basis of the example in FIG. 7A, the first conductive patterns 211b at the lower edge of the active region 211 are electrically connected with each other, and electrically connected with the wiring 212a within the inactive region at the lower side to form the coil 213 that is at the lower edge of the active region 211 and overlaps with the inactive region at the lower side.

An Embodiment

Figure 8:
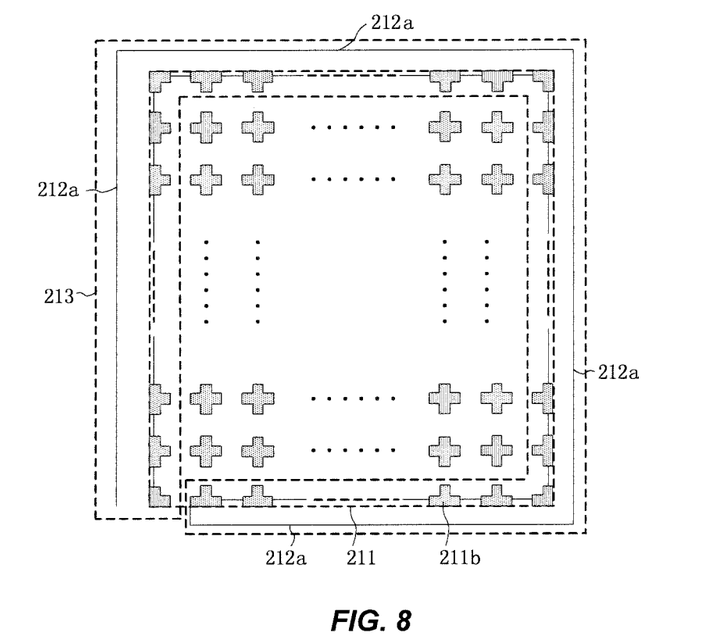
FIG. 8 is a schematic diagram illustrating the structure of a touch structure according to another embodiment of the present invention.

FIG. 8 is a schematic diagram illustrating the structure of a touch structure according to the present embodiment of the present invention. As shown in FIG. 8, on the basis of the touch structure of the above mentioned embodiment, the touch structure of the present embodiment is such that: the first conductive pattern 211$^b$ at edges on fourth sides (such as left, upper, right and lower sides in FIG. 8) of the active region 211 are electrically connected with each other, and electrically connected with the wirings 212a within the inactive region at the respective sides (such as left, upper, right and lower sides in FIG. 8) to form the coils 213.

The coils 213 formed in the present embodiment surrounds the active region 211, and when the electromagnetic pen touches any of edges of the active region 211, the coils 213 can improve the feature of the touch signal generated at respective locations.

The above mentioned embodiments have given that the first conductive patterns for forming coils which are at the edge of the active region and overlap with the inactive region are located at one or more edge of the active region, and then the location relationships between the first conductive patterns and coils provided within the active region are illustrated in subsequently preferable embodiments.

An Embodiment

Figure 9A:
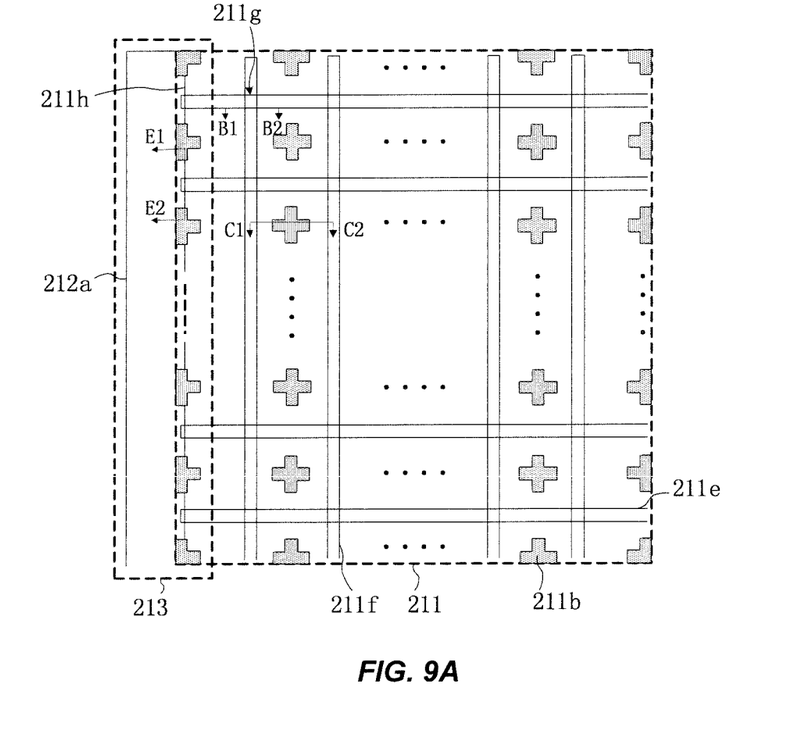
FIG. 9A is a schematic diagram illustrating a location relationship between the coils and the first conductive patterns provided within the active region of the touch structure according to another embodiment of the present invention.

FIG. 9A is a schematic diagram illustrating location relationships between the coils and the first conductive patterns provided within the active region of the touch structure according to the present embodiment of the present invention. As shown in FIG. 9A, the active region 211 further includes first oriented coils 211e (such as horizontal coils in FIG. 9A), and second oriented coils 211f (such as vertical coils in FIG. 9A) that intersect and are electrically insulated from the first oriented coils 211e and are disposed at the same layer as the first oriented coils 211e, where, each of the first oriented coils 211e is spaced into a plurality of segments by the second oriented coils 211f, and the plurality of segments of each of the first oriented coils 211e are electrically connected via first bridges 211g.

Figure 9B:
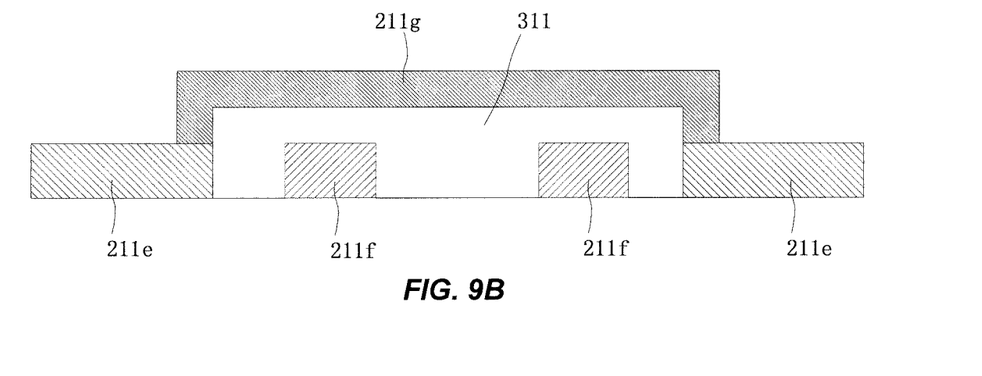
FIG. 9B is a schematic sectional diagram of the touch structure taken along a direction B1-B2 in FIG. 9A.

FIG. 9b is a schematic sectional diagram of the touch structure taken along a direction B1-B2 in FIG. 9A. As shown in FIG. 9b, two segments of the first oriented coil 211e spaced by the second oriented coil 211f are electrically connected via the first bridge 211g, where, the first oriented coil 211e and the first bridge 211g are respectively electrically insulated from the second oriented coil 211f via a first insulation layer 311.

Figure 9C:
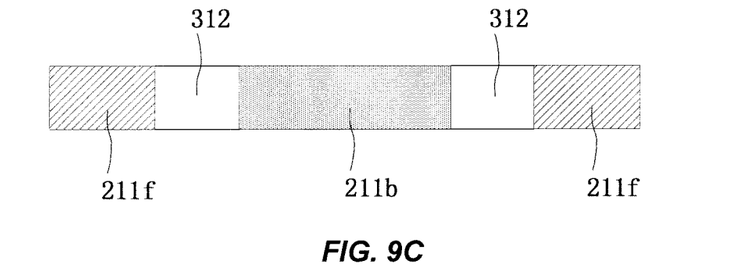
FIG. 9C is a schematic sectional diagram of the touch structure taken along a direction C1-C2 in FIG. 9A.

In the present embodiment, preferably, the first conductive patterns $211^b$ are disposed at the same layer as the first oriented coils 211e and the second oriented coils 211f, and electrically insulated from the first oriented coils 211e and the second oriented coils 211f. FIG. 9C is a schematic sectional diagram of the touch structure taken along a direction C1-C2 in FIG. 9C. As shown in FIG. 9C, the first conductive patterns 211b are electrically insulated from the second oriented coils 211f at the left side and right side of the first conductive patterns 211b via a second insulation layer 312. Similarly, each of the first conductive patterns 211b may be electrically insulated from the first oriented coils 211e at the upper and lower sides of the first conductive patterns $211^b$ via the second insulation layer 312, and respectively sectional diagram is similar to that of FIG. 9C, which is not discussed repeatedly herein.

It is noted that the first insulation layer 311 and the second insulation layer 312 may be the same insulation layer, or may be different insulation layers.

An Embodiment

Figure 10A:
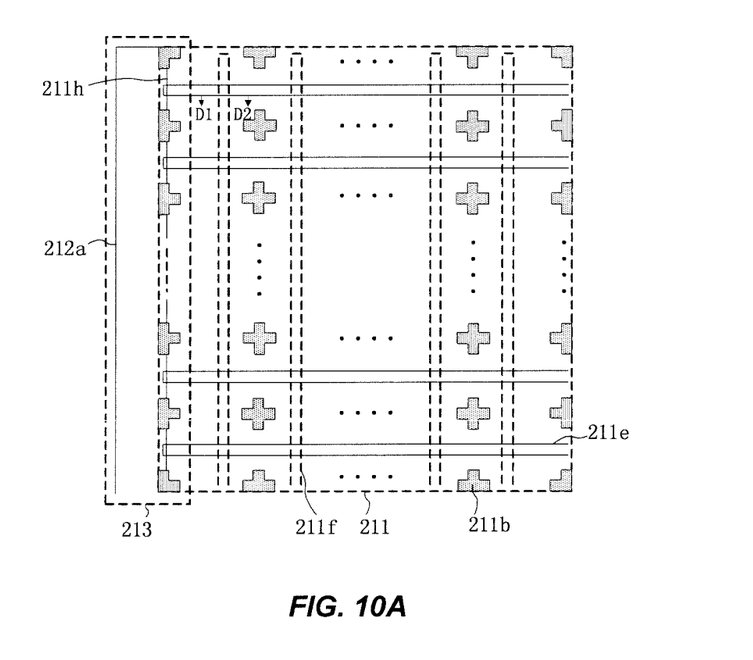
FIG. 10A is a schematic diagram illustrating a location relationship between the coils and the first conductive patterns provided within the active region of the touch structure according to another embodiment of the present invention.

FIG. 10A is a schematic diagram illustrating the structure of location relationships between the coils and the first conductive patterns provided within the active region of the touch structure according to the present embodiment of the present invention. As shown in FIG. 10A, the active region 211 further includes first oriented coils 211e (such as horizontal coils in FIG. 10A), and second oriented coils 211f (such as vertical coils in FIG. 10A) that intersect and are electrically insulated from the first oriented coils 211e and are disposed at a layer different from the first oriented coils 211e, where, the first oriented coils 211e are indicated with solid lines, and the second oriented coils 211f are indicated with dotted lines, which indicates that the first oriented coils 211e are located above the second oriented coils 211f. FIG. 10A merely illustrates a specific example, and in another specific example, the first oriented coils 211e may be located below the second oriented coils 211f.

Figure 10B:
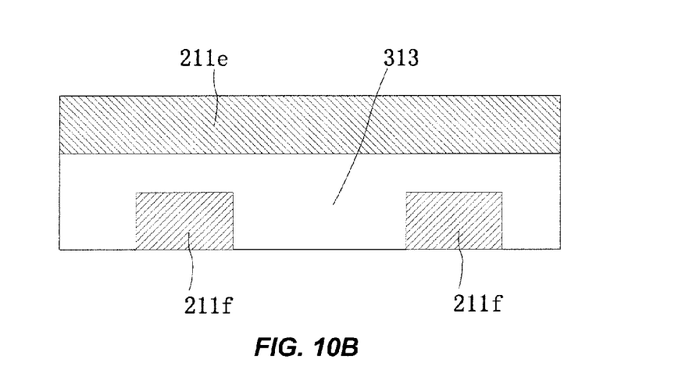
FIG. 10B is a schematic diagram of the touch structure taken along a direction D1-D2 in FIG. 10A.

FIG. 10b is a schematic sectional diagram of the touch structure taken along a direction D1-D2 in FIG. 10A. As shown in FIG. 10b, the first oriented coils 211e are electrically insulated from the second oriented coils 211f via a third insulation layer 313, respectively.

Further, as shown in FIG. 10A, the first conductive patterns $211^b$ are located at the same layer as the first oriented coils 211e and electrically insulated from the first oriented coils 211e. It is noted that the schematic sectional diagram of insulation of the first oriented coils 211e from the first conductive patterns 211b is illustrated with reference to FIG. 9C.

That the first conductive patterns $211^b$ are located at the same layer as the first oriented coils 211e is merely a specific example of the present embodiment, and in other examples, the first conductive patterns 211b may be located at the same layer as the second oriented coils 211f and electrically insulated from the second oriented coils 211f; the first conductive patterns 211b may be located above the first oriented coils 211e, below the second oriented coils 211f or between the first oriented coils 211e and the second oriented coils 211f, and electrically insulated from the first oriented coils 211e or/and the second oriented coils 211f, respectively.

Figure 11:
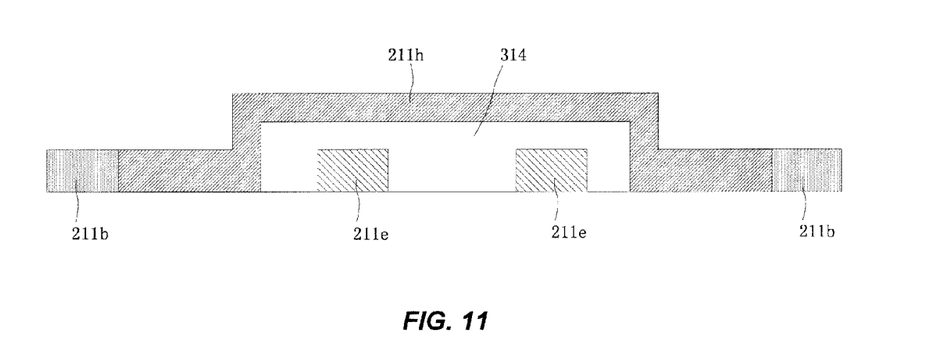
FIG. 11 is a schematic diagram of the touch structure taken along a direction E1-E2 in FIG. 9A.

In the above mentioned embodiments, preferably the first conductive patterns $211^b$ are electrically connected via the second bridges 211h. FIG. 11 is a schematic sectional diagram of the touch structure taken along a direction E1-E2 in FIG. 9A. As shown in FIG. 11, two adjacent first conductive patterns 211b are spaced by the first oriented coils 211e, and electrically connected via the second bridge 211h, where, the second bridge 211h is electrically insulated from the first oriented coils 211e via a fourth insulation layer 314. The schematic sectional diagram of electrical connection of the first conductive patterns 211b at two sides of the second oriented coils 211f via the second bridge 211h is similar to that of the FIG. 11, which is not discussed repeatedly herein. Additionally, the first conductive patterns can be electrically connected directly, and either the first oriented coils or the second oriented coils between the first conductive patterns are electrically connected by the bridges.

In above mentioned embodiments, preferably, the wirings 212a are located at the same layer as the first conductive patterns 211b or the second bridges 211h. It is noted since the wirings 212a are located within the inactive region, and the first conductive patterns 211b and the second bridge 211h are located within the active region 211, thus "the same layer" in which the wirings 212a are located at the same layer as either the first conductive patterns 211b or the second bridge 211h can be understood that the wirings 212a and the first conductive patterns 211b or the second bridge 211h are formed by manufacturing process of the same step (i.e. the wirings 212a and the first conductive patterns 211b or the second bridge 211h are formed by the same material) or manufacturing processes of the two adjacent steps (i.e. the wirings 212a and the first conductive patterns 211b or the second bridge 211h are formed by the different material). Further preferably, the wirings 212a and the first conductive patterns 211b or the second bridge 211h are formed by the same material so that the wirings 212a and the first conductive patterns 211$^b$ or the second bridge 211h can be formed in the manufacturing process of the same step, thereby decreasing processes and costs.

In the above embodiments, the material of the wirings 212a may be metal or transparent conductive material. The material of the first conductive patterns 211$^b$ may be metal or transparent conductive material, where, the transparent conductive material may be indium oxide, such as either Indium Tin Oxide (ITO) or Indium Zinc Oxide (IZO) or combination thereof.

It is noted that an area away from the edge of the active region 211 within the active region 211 in the above embodiments is also provided with the first conductive patterns 211b which are not electrically connected with each other within the area. The first conductive patterns 211$^b$ within the area can be electrically connected according to requirements when the touch structure is designed actually. For example, when the first conductive patterns 211$^b$ within the area need to have an electrostatic protection effect on a part within the active region 211 (such as a coil provided within the active region), the first conductive patterns 211$^b$ within the area can be electrically connected with the ground. Additionally, the first conductive patterns 211$^b$ can be not provided within an area away from the edge of the active region 211 according to requirement.

An Embodiment

Figure 12A:
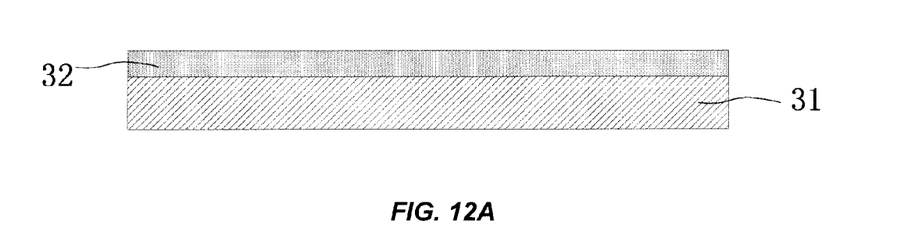
FIG. 12A is a schematic diagram illustrating the structure of the touch panel according to another embodiment of the present invention.

The present embodiment of the present invention provides a touch panel. FIG. 12A is a schematic diagram illustrating the structure of the touch panel according to the present embodiment of the present invention. As shown in FIG. 12A, the touch panel includes a first substrate 31 and a touch structure 32 provided on the first substrate 31. Additionally, the touch structure 32 may be also provided below the first substrate 31. The touch panel of such structure may be a touch panel without display function, i.e. a non-display touch panel.

Figure 12B:
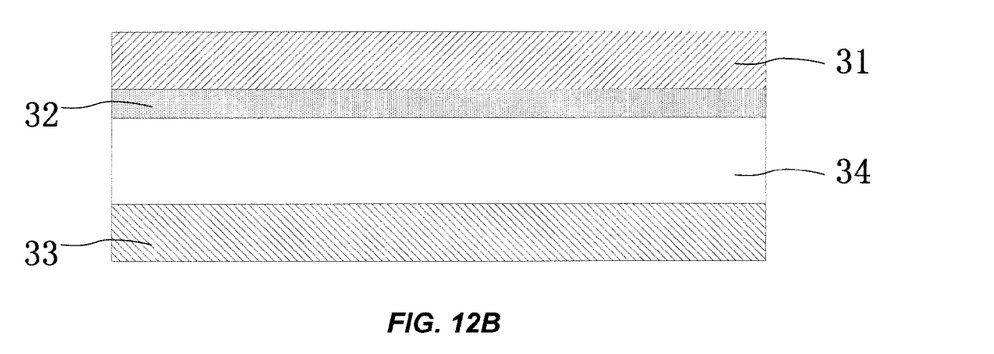
FIG. 12B is a schematic diagram illustrating the structure of another touch panel according to the above mentioned embodiment of the present invention.

FIG. 12b is a schematic structure illustrating the structure of another touch panel according to the present embodiment of the present invention. As shown in FIG. 12b, the touch panel includes a first substrate 31, a second substrate 33 provided opposite to the first substrate 31, an interlayer between the first substrate 31 and the second substrate 33, and a touch structure 32 on one side of the first substrate 31 and close to the interlayer 34. The touch structure of such structure may be a touch panel with display function, i.e. a display touch panel. The interlayer 34 is related to the display type of the touch panel. When liquid crystal display is utilized, the interlayer 34 may be a liquid crystal layer, the first substrate 31 may be a color film substrate, the second substrate may be a Thin Film Transistor (TFT) array substrate, and liquid crystal molecules within the liquid crystal layer are controlled by an electric field formed between common electrodes provided in the first substrate 31 and pixel electrodes provided in the second substrate 33 (corresponding to a twisted nematic electric field) or an electric filed formed between common electrodes and pixel electrodes provided in the second substrate 33 (corresponding to fringe-field switching or plane conversion electric field) to achieve a display function.

When an Organic Light Emitting Diode (OLED) is used for display, the interlayer 34 is configured for providing the OLED, the first substrate may be a color film substrate, packaging glass or cover glass and so on, the second substrate 33 may be a TFT array substrate, and the OLED in the interlayer 34 is controlled by the second substrate 33 to achieve a display function.

It is noted that the touch structure 32 may be provided at the inner surface of the first substrate 31, at the outer surface of the first substrate 31, or between any two film layers in the first substrate 31, or may be provided at the inner surface of the second substrate 33, at the outer surface of the second substrate 33, or between any two film layers in the second substrate 33, or may be provided at both the above positions of both the first substrate 31 and the second substrate 33 with respect to the display touch panel.

The above touch structure 32 provided in the touch panel may be the touch structure described in the above embodiments.

With the touch panel according to the present embodiment of the present invention, since the touch panel is provided with the touch structure which can improve the features of the touch signal at the edge, thus the touch panel also has the above beneficial effect.

An Embodiment

Figure 13:
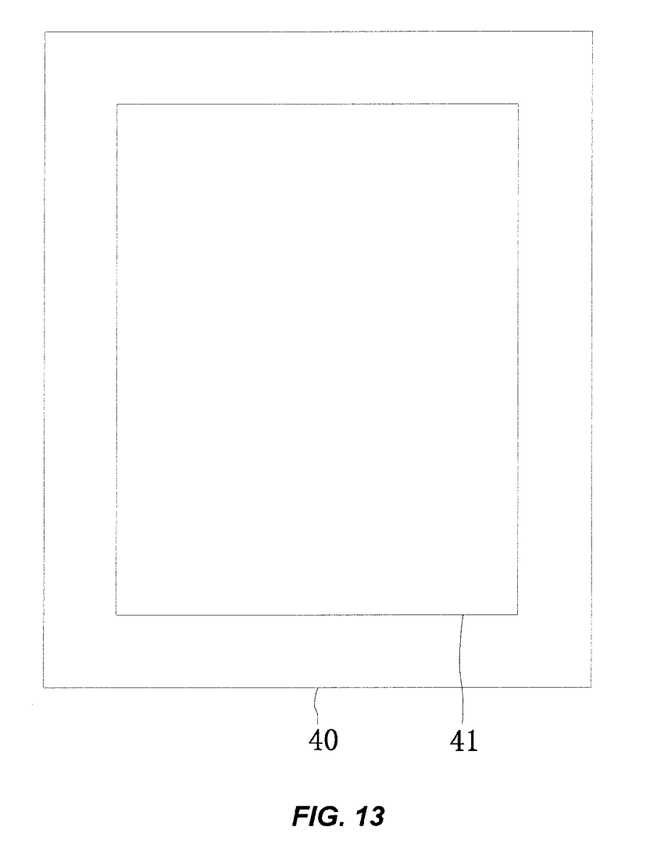
FIG. 13 is a schematic diagram illustrating the structure of a touch device according to another embodiment of the present invention.

The present embodiment of the present invention provides a touch device. FIG. 13 is a schematic diagram illustrating the structure of a touch device according to the present embodiment of the present invention. As shown in FIG. 13, the touch device 40 includes a touch panel 41, and may further includes driving circuits and other devices for enabling the touch device to work properly. The touch panel 41 may be the touch panel described in the embodiment of the above mentioned embodiment. When the touch panel 41 is a non-display touch panel, the touch device 40 is a non-display touch device and merely has a touch sensing function. When the touch panel 41 is a display touch panel, the touch device 40 is a display touch device and has a display function and a touch sensing function. Then the touch device 40 may be one of a cellphone, a tablet computer, electric paper.

With the touch device according to the present embodiment of the present invention, since the touch panel which can improve the features of the touch signal at the edge is utilized, thus the touch device also has the above beneficial effect.

It is noted that the preferable embodiments and the applied technology principles of the present disclosure are merely described as above. It should be understood for those skilled in the art that the present disclosure is not limited to particular embodiments described herein. Various apparent changes, readjustment and alternative can be made by those skilled in the art without departing the scope of protection of the present disclosure. Therefore, although the present disclosure is illustrated in detail through the above embodiments, the present disclosure is not merely limited to the above embodiments, and can further include more of other equivalent embodiments without departing the conception of the present disclosure. The scope of the present disclosure is subject to the appended claims.

What is claimed is:

1. A touch structure comprising:
    an active region comprising a plurality of first conductive patterns; and
    an inactive region comprising a wiring,
    wherein the first conductive patterns at an edge of the active region are electrically connected with each other and are electrically connected with the wiring of the inactive region to form a coil.

2. The touch structure according to claim 1, wherein the plurality of first conductive patterns are arranged in an array.

3. The touch structure according to claim 1, wherein the first conductive patterns comprise dummy electrodes.

4. The touch structure according to claim 1, wherein the first conductive patterns at the edge on the same side of the active region are electrically connected with each other, and are electrically connected with the wiring of the inactive region on said the same side.

5. The touch structure according to claim 1, wherein the first conductive patterns at edges on two adjacent sides of the active region are electrically connected with each other, and are electrically connected with the wirings of the inactive region at the respective two sides.

6. The touch structure according to claim 1, wherein the first conductive patterns at edges on three sides of the active region are electrically connected with each other, and are electrically connected with the wirings of the inactive region at the respective three sides.

7. The touch structure according to claim 1, wherein the first conductive patterns at edges on four sides of the active region are electrically connected with each other, and are electrically connected with the wirings of the inactive region at the respective four sides.

8. The touch structure according to claim 1, wherein the touch structure comprises at least one of an electromagnetic touch structure and an electromagnetism and capacitance integrated touch structure.

9. The touch structure according to claim 1, wherein the active region further comprises:
    a plurality of first oriented coils, and
    a plurality of second oriented coils which intersect and are electrically insulated from the first oriented coils and are disposed at the same layer as the first oriented coils,
    wherein each of the first oriented coils is divided into a plurality of segments by the second oriented coils, and the plurality of segments of each of the first oriented coils are electrically connected via first bridges.

10. The touch structure according to claim 9, wherein the first conductive patterns are located in the same layer as the first oriented coils and the second oriented coils, and electrically are insulated from the first oriented coils and the second oriented coils.

11. The touch structure according to claim 1, wherein the active region further comprises:
    a plurality of first oriented coils, and
    a plurality of second oriented coils, wherein the second oriented coils intersect and are electrically insulated from the first oriented coils and are disposed at a layer different from the first oriented coils.

12. The touch structure according to claim 11, wherein at least one of:
    the first conductive patterns are located formed in the same layer as the first oriented coils and are electrically insulated from the first oriented coils; and
    the first conductive patterns are located formed in the same layer as the second oriented coils and are electrically insulated from the second oriented coils.

13. The touch structure according to claim 9, wherein the first conductive patterns are electrically connected via second bridges, and the wirings are located in the same layer as one of the first conductive patterns and the second bridges.

14. The touch structure according to claim 11, wherein the first conductive patterns are electrically connected via second bridges, and the wirings are located in the same layer as one of the first conductive patterns and the second bridges.

15. A touch panel, comprising a touch structure, the touch structure comprising:
    an active region comprising a plurality of first conductive patterns; and
    an inactive region comprising a wiring,
    wherein the first conductive patterns at an edge of the active region are electrically connected with each other and are electrically connected with the wiring of the inactive region to form a coil.

16. The touch panel according to claim 15, wherein the first conductive patterns comprise dummy electrodes.

17. The touch panel according to claim 15, wherein at least one of:
    the first conductive patterns at the edge on the same side of the active region are electrically connected with each other, and are electrically with the wiring of the inactive region on said the same side;
    the first conductive patterns at edges on two adjacent sides of the active region are electrically connected with each other, and are electrically connected with the wirings of the inactive region at the respective two sides;
    the first conductive patterns at edges on three sides of the active region are electrically connected with each other, and are electrically connected with the wirings of the inactive region at the respective three sides;
    the first conductive patterns at edges on four sides of the active region are electrically connected with each other, and electrically are connected with the wirings of the inactive region at the respective four sides.

18. The touch panel according to claim 15, wherein the touch structure is one of an electromagnetic touch structure and an electromagnetism and capacitance integrated touch structure.

19. The touch panel according to claim 15, wherein the active region further comprises:
    first oriented coils, and
    second oriented coils, wherein the second oriented coils intersect and are electrically insulated from the first oriented coils, and are formed in the same layer as the first oriented coils,
    wherein each of the first oriented coils is divided into a plurality of segments by the second oriented coils, and the plurality of segments of each of the first oriented coils are electrically connected via first bridges.

20. A touch device, comprising a touch panel, the touch panel comprising a touch structure, the touch structure comprising:
    an active region comprising a plurality of first conductive patterns; and
    an inactive region comprising a wiring,
    wherein the first conductive patterns at an edge of the active region are electrically connected with each other and are electrically connected with the wiring of the inactive region to form a coil.

* * * * *